F. H. BALL.
Valve-Gear.

No. 8,077. Reissued Feb. 12, 1878.

Charles J. Buchheit
John Tyler
} Witnesses

Frank H. Ball Inventor.
by Wilhelm & Bonner
Attorneys.

N. PETERS, PHOTO-LITHOGRAPHER, WASHINGTON, D. C.

UNITED STATES PATENT OFFICE.

FRANK H. BALL, OF FOXBURG, PENNSYLVANIA.

IMPROVEMENT IN VALVE-GEARS.

Specification forming part of Letters Patent No. 161,195, dated March 23, 1875; Reissue No. 8,077, dated February 12, 1878; application filed December 21, 1877.

*To all whom it may concern:*

Be it known that I, FRANK H. BALL, of Foxburg, in the county of Clarion and State of Pennsylvania, have invented a new and useful Improvement in Valve-Gear for Steam-Engines, of which the following is a specification:

My invention relates more especially to that class of steam-engines which are provided with two eccentrics for running the engine in one or the other direction, and in which the ends of the eccentric-rods are connected by a bar, so as to be engaged alternately with a pin or stud on the valve arm or stem.

This construction is objectionable for the reason that the reversing of the valve is accomplished entirely by the inclined claws or hooks attached to the eccentric-rods, and that these claws or hooks must be made very long in order to come in contact with the pin or stud of the valve-arm in every position of the latter, whereby the reversing-gear is caused to work very hard, and, furthermore, occasionally permits the pin of the valve-arm to become disengaged from the eccentric-rods by passing through the space between the long claws thereof.

The principal object of my invention is to remedy these defects; and it consists, mainly, in providing the valve stem or arm with two studs, and arranging the connecting-bar of the eccentric-rods between these studs, so that both sides of the connecting-bar are rendered operative in reversing the valve, and the valve-arm is always connected with the eccentric-rods.

My invention also consists of certain means for compensating for the wear of the eccentric-rods at the points where they engage with the stud on the valve-arm.

Figure 1:
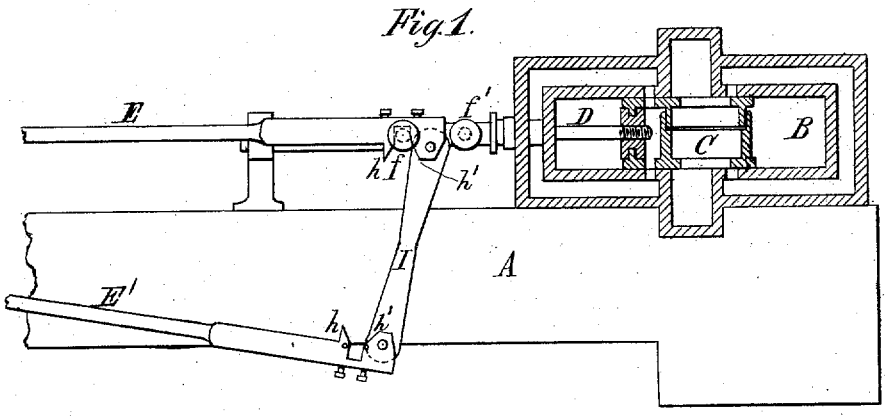
Figure 2:
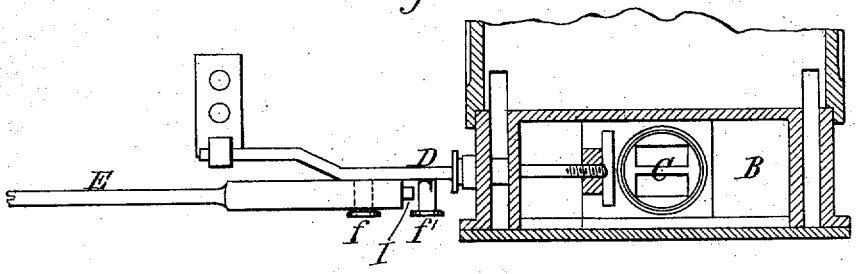
Figure 3:
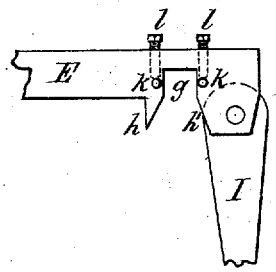

In the accompanying drawing, Figure 1 is a side elevation of my improved valve-gear with the steam-chest in section. Fig. 2 is a top-plan view thereof. Fig. 3 is a detached view on an enlarged scale of the end of one of the eccentric-rods.

Like letters of reference designate like parts in each of the figures.

A represents the bed-plate or frame of a steam-engine; B, the valve-chest; C, the valve. D is the valve stem, rod, or arm, and E E′ the eccentric-rods. *f f′* are two studs or pins secured to the valve-rod D, or other part by which the valve is actuated, so as to project laterally therefrom. *g* is the recess formed in the end of each eccentric-rod for the purpose of engaging with the pin *f*. *h h′* are inclined guide arms or claws formed on the end of each eccentric-rod, on both sides of each recess *g*, as is usual in this class of valve-gear. I is a connecting-bar, pivoted to the ends of the eccentric-rods E E′ so as to play between the studs *f f′* of the valve-rod.

In shifting the eccentric-rods for reversing the valve the rear side of the bar I will operate on the stud *f* as a continuation of the inclined guides *h′*, while the front side of the bar I will engage against the stud *f′*, and thereby aid in moving the valve-rod to the proper position for engaging the pin *f* in the notch *g* of the respective eccentric-rod.

The bar I is preferably made of double-wedge shape, or narrow at the center and enlarging toward the eccentric-rods, when the reduced inner portion of the bar I will permit the eccentric-rods to drop a certain distance in being shifted before the bar I engages with either stud *f f′*, whereby the eccentric-rods acquire a certain momentum, which greatly facilitates the reversing of the valve.

As the bar I is always in contact with one of the studs *f f′*, the valve arm or stem is never entirely released from the eccentric-rods, and the reversing-claws on the latter can be made considerably shorter than in reversing mechanism of this description in which only one stud is employed.

*k k* are bearing pins or cylinders, arranged transversely in corresponding cavities or seats formed on each side of the recesses *g* of the eccentric-rods, so that the pins *k* expose a portion of their surface in each recess, and receive the wear of the stud *f*. The pins *k* are held in place, as clearly shown in Fig. 3, by set-screws *l*, so that after they have become worn they can be readily turned in their seats, and a new portion exposed to the action of the stud *f*, and also be readily replaced by new pins when entirely worn out.

I claim as my invention—

1. The combination, with the eccentric-rods E E′, of the valve-rod D, provided with studs

*f f'*, and bar I, arranged between said studs, and connecting the ends of the eccentric-rods, substantially as and for the purpose set forth.

2. The combination, with the recessed eccentric-rods E E' and studs *f f'*, of the double-wedge-shaped bar I, arranged between said studs, and connecting the ends of the eccentric-rods, substantially as and for the purpose hereinbefore set forth.

3. The combination, with the eccentric-rods E E', provided with recesses *g*, of the bearing-pins *k* and set-screws *l*, substantially as and for the purpose hereinbefore set forth.

F. H. BALL.

Witnesses:
EDWARD WILHELM,
CHAS. J. BUCHHEIT.